(12) United States Patent
Mayo et al.

(10) Patent No.: US 10,112,382 B2
(45) Date of Patent: Oct. 30, 2018

(54) SYSTEMS AND METHODS FOR DELIVERING AQUEOUS PEARLESCENT DIGITAL PRINTING INK COMPOSITIONS USING DIGITAL OFFSET LITHOGRAPHIC PRINTING TECHNIQUES

(71) Applicant: XEROX CORPORATION, Norwalk, CT (US)

(72) Inventors: James D. Mayo, Mississauga (CA); Frank Ping-Hay Lee, Oakville (CA); Aurelian Valeriu Magdalinis, Aurora (CA); Marcel Breton, Mississauga (CA); Jenny Eliyahu, Maple (CA); Carolyn Moorlag, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 85 days.

(21) Appl. No.: 15/143,034

(22) Filed: Apr. 29, 2016

(65) Prior Publication Data

US 2016/0243813 A1 Aug. 25, 2016

Related U.S. Application Data

(62) Division of application No. 13/907,836, filed on May 31, 2013, now Pat. No. 9,388,319.

(51) Int. Cl.
*B41F 7/02* (2006.01)
*C09D 11/037* (2014.01)
(Continued)

(52) U.S. Cl.
CPC ............ *B41F 7/02* (2013.01); *B41F 7/00* (2013.01); *B41F 7/20* (2013.01); *B41F 7/26* (2013.01); *C09D 11/037* (2013.01); *C09D 11/101* (2013.01); *C09D 11/107* (2013.01); *G03G 15/6585* (2013.01); *B41P 2227/00* (2013.01); *G03G 15/10* (2013.01)

(58) Field of Classification Search
CPC ........................................................ B41F 7/20
See application file for complete search history.

(56) References Cited

U.S. PATENT DOCUMENTS 5,445,671 A 8/1995 Herget et al.
6,663,704 B2 12/2003 Spencer et al.
(Continued)

*Primary Examiner* — Jennifer Simmons
(74) *Attorney, Agent, or Firm* — Caesar Rivise, PC

(57) ABSTRACT

A system and method are provided for producing variable pearlescent image elements or portions on image receiving media substrates using a variable digital data offset lithographic architecture which provides for varying lithographic images between cycles of a marking device. Pearlescent inks are provided with a solid particle pearlescent pigment components in a proportion of at least 30% by weight suspended in solution in an ink composition. Pearlescent inks are provided with a solid particle pearlescent pigment components having particle sizes in excess of ten microns suspended in solution in the ink composition. The disclosed systems and methods provide for variable pearlescent image elements or portions to be formed on an image receiving medium substrate separate from, or in combination with, other ink image elements or portions applied using other inks in a single device, and/or in a single pass of the image receiving media substrates through an image forming system.

9 Claims, 4 Drawing Sheets

(51) Int. Cl.
*C09D 11/107* (2014.01)
*B41F 7/20* (2006.01)
*B41F 7/00* (2006.01)
*B41F 7/26* (2006.01)
*G03G 15/00* (2006.01)
*C09D 11/101* (2014.01)
*G03G 15/10* (2006.01)

(56) References Cited

U.S. PATENT DOCUMENTS

| | | |
|---|---|---|
| 8,114,924 B2 | 2/2012 | Kust |
| 8,735,461 B2 | 5/2014 | Grüner et al. |
| 8,851,649 B2 | 10/2014 | Engel et al. |
| 2005/0155503 A1* | 7/2005 | Onuma ................ B41F 7/06 101/177 |
| 2006/0075917 A1* | 4/2006 | Edwards ............ B41J 11/0015 101/483 |
| 2007/0068404 A1* | 3/2007 | Hirahara ............... B41J 2/0057 101/141 |
| 2008/0308003 A1 | 12/2008 | Krol et al. |
| 2011/0132213 A1* | 6/2011 | DeJoseph ............ B41C 1/1066 101/130 |
| 2012/0103212 A1* | 5/2012 | Stowe ................ B41C 1/1041 101/147 |
| 2012/0125229 A1* | 5/2012 | Gruner ................ C09C 1/0021 106/31.86 |
| 2012/0274914 A1* | 11/2012 | Stowe ..................... B41F 7/00 355/53 |

\* cited by examiner

SYSTEMS AND METHODS FOR DELIVERING AQUEOUS PEARLESCENT DIGITAL PRINTING INK COMPOSITIONS USING DIGITAL OFFSET LITHOGRAPHIC PRINTING TECHNIQUES

CROSS-REFERENCE TO RELATED APPLICATIONS

This application is a Divisional application of U.S. patent application Ser. No. 13/907,836, filed May 31, 2013, which published as U.S. Patent Application Publication No. US 2014-0352560 A1 on Dec. 4, 2014, and is related to U.S. patent application Ser. No. 13/907,823, entitled "Systems and Methods For Facilitating Magnetic Ink Character Recognition (MICR) Image Forming Using Digital Offset Lithographic Techniques," filed on May 31, 2013, which issued as U.S. Pat. No. 8,974,051 on Mar. 10, 2015, the disclosures of which are hereby incorporated by reference herein in their entirety.

BACKGROUND

1. Field of Disclosed Subject Matter

This disclosure relates to systems and methods that provide an ability to deliver high quality variable pearlescent ink images on successive substrates using a proposed variable digital offset lithographic image forming architecture.

2. Related Art

The visual phenomenon known as pearlescence refers generally to a limitedly iridescent response of a prepared surface to incident light. Pearlescent surfaces reflect incident light in a manner that appears to change color like the surface of a pearl as the angle of view of the surface or the angle of illumination by the incident light on the surface changes. The broader iridescent visual phenomenon is commonly observed from surfaces including soap bubbles, butterfly wings, and sea shells.

Pearlescent coatings or pigments, which may be deliverable as paints or inks provide the pearlescent visual effect for decorative or ornamental purposes using printable products and/or industrial coatings or paints. A common contemporary example of the decorative use of the pearlescent visual phenomenon, and more broadly the iridescent visual phenomenon, is in its application in paint formulations used by the automotive industry to give cars a lustrous, metallic color changing (or chameleon-like) appearance.

Efforts to extend the concepts of delivering pearlescent images to surfaces in the printing arts have seen limited success. Printed pearlescent products have been explored not only for the decorative properties that the pearlescent printed materials provide, but also for their potential security properties in providing a capability to uniquely mark a document for identification in a manner that may be more difficult, for example, for a counterfeiter to reproduce.

The pearlescent effect on printed products can be difficult to generate because the metallic sheen is generated through the use of comparatively large solid pigment particles, on the order of tens of microns, which are difficult to stabilize in an ink composition. Digital printing using pearlescent inks is very difficult using conventional digital imaging techniques as the pearlescent inks prove nearly impossible to jet based on the necessary particle sizes appropriate to produce the pearlescent effect in the finished documents.

Pearlescent inks can be used to form printed materials using conventional lithographic and offset lithographic printing techniques. These techniques, however, use plates that are permanently patterned, and are, therefore, generally considered to be most useful only when printing a same image in long print runs. Conventional lithographic techniques, while suitable for producing pearlescent images on documents, are generally not considered amenable to creating and printing a new pattern from one page to the next because, according to known methods, removing and replacing of plates, including on a print cylinder, is required in order to change images. Because conventional lithographic techniques cannot accommodate true high speed variable data printing processes in which the images to be printed change from impression to impression, for example, as in the case of digital printing systems, these techniques do not provide an opportunity to effectively and/or economically produce pearlescent images on documents that change from page to page or across small runs of pages.

Typically, ink jet printing techniques are considered to be most amenable to high speed variable data digital image forming. A shortfall for certain printing applications, including pearlescent image forming, is that the physical compositions of the jetted inks must be carefully controlled within fairly rigid parameters. Generally, jetted inks cannot be particularly viscous and/or they cannot contain solid pigment particles over a certain size. Overly viscous ink compositions, or ink compositions having solid particles with larger particle sizes, will tend to very easily clog the jets and introduce other issues that adversely affect image forming operations through the ink jetting process supporting the digital printing. Producing jet nozzles with sufficient diameters to prevent this clogging is not reasonably feasible based on the array of other physical and operational characteristics that appropriately large nozzles would introduce.

The preparation of jettable inks often involves extensive pulverization of the solid elements, such as the pigments or other solids included in the ink compositions, with, for example, steel shot or in a grinder (high speed media mill), in order that the solid elements are more easily suspended in the liquid thus making them easier to pass in the ink jetting process.

A difficulty arises in the compatibility of the pearlescent printing scheme with inks prepared by pulverizing the solid elements in that the pearlescent properties will be lost if the pearlescent pigment particles are pulverized to an appropriately jettable size. To preserve the variable reflectivity of the pearlescent finish, or to make the finished surfaces pearlesce, it is easily understood that a larger reflecting surface for each of the constituent particles is preferred. In fact those of skill in the art recognize that, in order to preserve the pearlescent phenomenon in a printed image, the solid pearlescent pigment particles need to be on the order of ten of microns in diameter, each representing a little shiny mirror in the ink.

A desire to form variable digitally produced pearlescent images on successive image receiving medium substrates conflicts with the practical need in preparing jettable inks to pulverize the solids into as small a size as possible for those constituent elements of the jettable inks. When this requirement for pulverization is combined with a concern that only limited amounts of any pigment solids can be added to the jettable ink solution without adversely affecting the viscosity of the jettable ink solution, it becomes clear that producing high quality digital pearlescent images in a conventional digital printing process using jettable inks is nearly impossible. These limitations that may keep the advantages of pearlescent image forming for printed documents from being fully realized and exploited.

SUMMARY OF THE DISCLOSED EMBODIMENTS

U.S. Patent Application Publication No. 2012/0103212 A1 (the 212 Publication) published May 3, 2012 and based on U.S. patent application Ser. No. 13/095,714, which is commonly assigned and the disclosure of which is incorporated by reference herein in its entirety, proposes systems and methods for providing variable data lithographic and offset lithographic printing or image receiving medium marking. The systems and methods disclosed in the 212 Publication are directed to improvements on various aspects of previously-attempted variable data imaging lithographic marking concepts based on variable patterning of fountain solutions to achieve effective truly variable digital data lithographic printing.

According to the 212 Publication, a reimageable surface is provided on an imaging member, which may be a drum, plate, belt or the like. The reimageable surface may be composed of, for example, a class of materials commonly referred to as silicones, including polydimethylsiloxane (PDMS) among others. The reimageable surface may be formed of a relatively thin layer over a mounting layer, a thickness of the relatively thin layer being selected to balance printing or marking performance, durability and manufacturability.

The 212 Publication describes, in requisite detail, an exemplary variable data lithography such as that shown, for example, in FIG. 1. A general description of the exemplary system 100 shown in FIG. 1 is provided here. Additional details regarding individual components and/or subsystems shown in the exemplary system 100 of FIG. 1 may be found in the 212 Publication.

As shown in FIG. 1, the exemplary system 100 may include an imaging member 110. The imaging member 110 in the embodiment shown in FIG. 1 is a drum, but this exemplary depiction should not be read in a manner that precludes the imaging member 110 being a plate or a belt, or of another known configuration. The imaging member 110 is used to apply an ink image to an image receiving media substrate 114 at a transfer nip 112. The transfer nip 112 is produced by an impression roller 118, as part of an image transfer mechanism 160, exerting pressure in the direction of the imaging member 110. Image receiving medium substrate 114 should not be considered to be limited to any particular composition such as, for example, paper, plastic, or composite sheet film. The exemplary system 100 may be used for producing images on a wide variety of image receiving media substrates. The 212 Publication also explains the wide latitude of marking (printing) materials that may be used, including marking materials with pigment densities greater than 10% by weight. As does the 212 Publication, this disclosure will use the term ink to refer to a broad range of printing or marking materials to include those which are commonly understood to be inks, pigments, and other materials which may be applied by the exemplary system 100 to produce an output image on the image receiving media substrate 114.

The 212 Publication depicts and describes details of the imaging member 110 including the imaging member 110 being comprised of a reimageable surface layer formed over a structural mounting layer that may be, for example, a cylindrical core, or one or more structural layers over a cylindrical core.

The exemplary system 100 includes a fountain solution subsystem 120 generally comprising a series of rollers, which may be considered as dampening rollers or a dampening unit, for uniformly wetting the reimageable surface of the imaging member 110 with fountain solution. A purpose of the fountain solution subsystem 120 is to deliver a layer of fountain solution, generally having a uniform and controlled thickness, to the reimageable surface of the imaging member 110. The fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well to adjust the inking and transfer properties of the reimageable surface of the imaging member 110.

Once the fountain solution is metered onto the reimageable surface of the imaging member 110, a thickness of the fountain solution may be measured using a sensor 125 that may provide feedback to control the metering of the fountain solution onto the reimageable surface of the imaging member 110 by the fountain solution subsystem 120.

Once a precise and uniform amount of fountain solution is provided by the fountain solution subsystem 120 on the reimageable surface of the imaging member 110, and optical patterning subsystem 130 may be used to selectively form a latent image in the uniform fountain solution layer by image-wise patterning the fountain solution layer using, for example, laser energy. The reimageable surface of the imaging member 110 should ideally absorb most of the laser energy emitted from the optical patterning subsystem 130 close to the surface to minimize energy wasted in heating the fountain solution and to minimize lateral spreading of heat in order to maintain a high spatial resolution capability. Alternatively, an appropriate radiation sensitive component may be added to the fountain solution to aid in the absorption of the incident radiant laser energy. While the optical patterning subsystem 130 is described above as being a laser emitter, it should be understood that a variety of different systems may be used to deliver the optical energy to pattern the fountain solution.

The mechanics at work in the patterning process undertaken by the optical patterning subsystem 130 of the exemplary system 100 are described in detail with reference to FIG. 5 in the 212 Publication. Briefly, the application of optical patterning energy from the optical patterning subsystem 130 results in selective evaporation of portions of the layer of fountain solution.

Following patterning of the fountain solution layer by the optical patterning subsystem 130, the patterned layer over the reimageable surface of the imaging member 110 is presented to an inker subsystem 140. The inker subsystem 140 is used to apply a uniform layer of ink over the layer of fountain solution and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface. The inker subsystem 140 may deposit the ink to the pockets representing the imaged portions of the reimageable surface, while ink deposited on the unformatted portions of the fountain solution will not adhere based on the hydrophobic and/or oleophobic nature of those portions.

A cohesiveness and viscosity of the ink residing in the reimageable layer of the imaging member 110 may be modified by a number of mechanisms. One such mechanism may involve the use of a rheology (complex viscoelastic modulus) control subsystem 150. The rheology control system 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the reimageable surface of the imaging member 110 to a substrate of image receiving medium 114 using a transfer subsystem 160. The transfer occurs as the substrate 114 is passed through a transfer nip 112 between the imaging member 110 and an impression roller 118 such that the ink within the voids of the reimageable surface of the imaging member 110 is brought into physical contact with the substrate 114. With the adhesion of the ink having been modified by the rheology control system 150, modified adhesion of the ink causes the ink to adhere to the substrate 114 and to separate from the reimageable surface of the imaging member 110. Careful control of the temperature and pressure conditions at the transfer nip 112 may allow transfer efficiencies for the ink from the reimageable surface of the imaging member 110 to the substrate 114 to exceed 95%. While it is possible that some fountain solution may also wet substrate 114, the volume of such a fountain solution will be minimal, and will rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method using an offset roller or other device as an intermediate transfer body.

Following the transfer of the majority of the ink to the substrate 114 at the transfer nip 112, any residual ink and/or residual fountain solution must be removed from the reimageable surface of the imaging member 110 to prepare the reimageable surface to repeat the digital image forming operation. His removal is most preferably undertaken without scraping or wearing the reimageable surface of the imaging member 110. An air knife or other like non-contact device may be employed to remove residual fountain solution. It is anticipated, however, that some amount of ink residue may remain. Removal of such remaining ink residue may be accomplished through use of some form of cleaning subsystem 170. The 212 Publication describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the fountain solution of the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade or other like device and collected as waste.

The 212 Publication details other mechanisms by which cleaning of the reimageable surface of the imaging member 110 may be facilitated. Regardless of the cleaning mechanism, however, cleaning of the residual ink and fountain solution from the reimageable surface of the imaging member 110 is essential to preventing ghosting in subsequent image forming operations as the images change. Once cleaned, the reimageable surface of the imaging member 110 is again presented to the fountain solution subsystem 120 by which a fresh layer of fountain solution is supplied to the reimageable surface of the imaging member 110, and the process is repeated.

According to the above proposed structure, variable data digital lithography has attracted attention in producing truly variable digital images in a lithographic image forming system. The above-described architecture combines the functions of the imaging plate and potentially a transfer blanket into a single imaging member 110.

It would be advantageous to adapt the above-described variable digital data lithographic printing system to support effective variable digital pearlescent image forming for printed products delivered to successive image receiving media substrates.

Exemplary embodiments of the systems and methods according to this disclosure may take advantage of the proposed variable digital data lithographic printing architecture to provide, at once, a speed of offset printing and the digital capability of ink jet or xerographic printing for variable pearlescent image forming on successive individual substrates.

Exemplary embodiments may include prepared pearlescent inks based on the components used to make inks for the proposed variable digital data lithographic printing architecture described above. The pearlescent inks may comprise, for example, greater than 15 percent by weight (and upwards to 50 percent by weight) pigment particles suspended in an aqueous solution to support variable pearlescent image forming.

Exemplary embodiments may provide for pearlescent pigment particles with a particle size of more than ten microns, i.e., 10 to 15 to 20 microns and greater in size, to ensure the pearlescent effect on the printed products to be suspended in an ink solution of compatible products for use in the variable digital data lithographic printing architecture.

Exemplary embodiments may provide for pearlescent pigment particles to be suspended in an acrylate ink vehicle that may be water dilutable, with an addition of water being available to adjust and/or enhance background performance for use in the variable digital data lithographic printing architecture.

Exemplary embodiments may support larger volumes of comparatively larger particle sized pigment elements without concern for the limitations imposed in conventional digital image forming methods including ink jetting of the pearlescent inks.

Exemplary embodiments may make advantageous use of the characteristics of digital offset inks that are formulated to contain much higher (up to ten times) pigment loading and therefore have higher viscosity at room temperature in a variable digital data printing process. The larger metal flake particles of the pearlescent inks would not be pulverized, which would enhance the visual phenomenon of the finished materials. Further, film thicknesses or pile heights may be controlled easily using the variable digital data lithographic printing architectures by modifying the image area of the printing plate. This control of film thickness may be used to influence the degree of pearlescence observed in the final print image formed on the image receiving medium substrate.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods that provide an ability to produce high quality pearlescent images on substrates using a proposed variable digital offset lithographic architecture will be described, in detail, with reference to the following drawings, in which.

DETAILED DESCRIPTION OF THE DISCLOSED EMBODIMENTS

Figure 1:
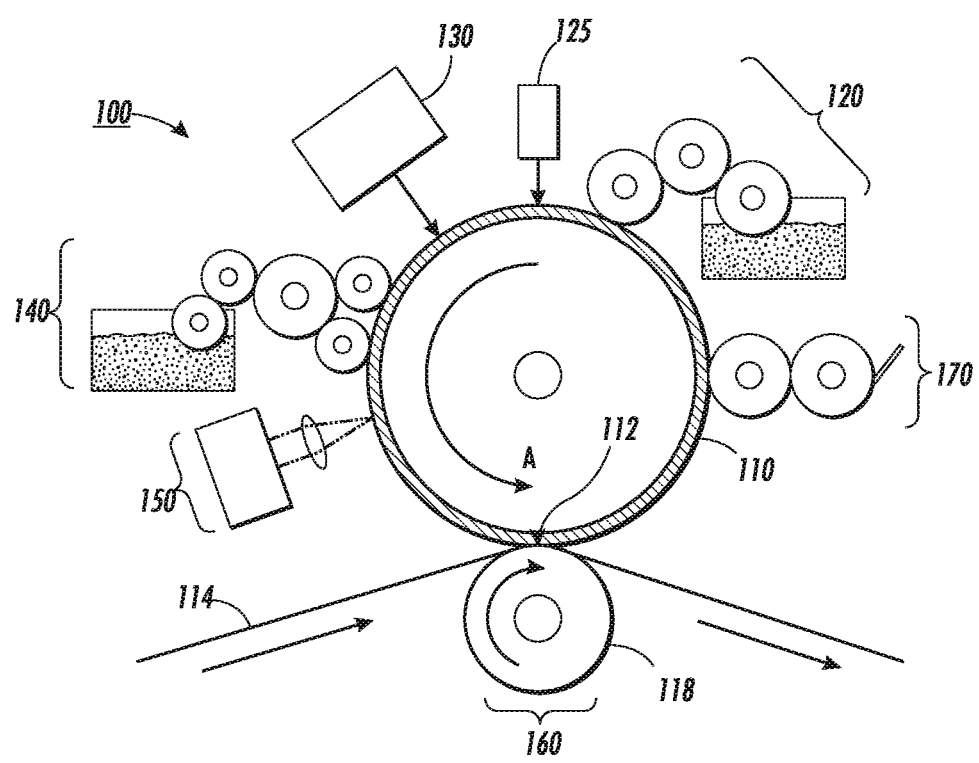
FIG. 1 illustrates a schematic representation of a proposed variable data lithographic printing system.

The systems and methods that provide an ability to produce high quality pearlescent printed images on substrates in a heretofore unachievable manner using a proposed variable digital offset lithographic architecture according to this disclosure will generally refer to this specific utility or function for those systems and methods. Exemplary embodiments described and depicted in this disclosure should not be interpreted as being specifically limited to any particular configuration of the described image forming elements, or as being specifically directed to any particular intended use for those elements. Any advantageous adaptation of a digital image forming process to accommodate the use of pearlescent inks in, for example, a variable data lithographic printing system that facilitates high quality variable output pearlescent images, is contemplated as being included in this disclosure.

Specific reference to, for example, lithographic printing techniques, and to the proposed variable data lithographic printing device should not be considered as being limited to any particular configuration of the techniques or devices, as described. The terms "image forming device," "offset lithographic printing device/system," "offset lithographic marking device/system" and the like, as referenced throughout this disclosure are intended to refer globally to a class of devices and systems that carry out what are generally understood as lithographic marking functions as those functions would be familiar to those of skill in the art. Additionally, while references will be made to individual pearlescent ink compositions and the like, these references, and described compositions of constituent elements too, are intended to be exemplary only and not limiting to the disclosed subject matter.

Exemplary pearlescent inks have been tested for use in the proposed variable digital offset lithographic architecture, which has been referred to as a "Digital Advanced Lithographic Imaging" or DALI system. In these exemplary pearlescent inks, for example, commercially available pearlescent pigments were used. Inks having a 15 percent by weight pigment were prepared to test the concepts represented in the disclosed schemes. Significantly higher pigment loadings are understood to be within the latitude afforded by the use of the disclosed techniques.

A specific component mix that was selected to prove the feasibility of the disclosed scheme for variable pearlescent image forming included the following (see Table 1): a pearlescent pigment of Afflair 520 Satin Bronze, available from EM Industries Inc.®; curable functional acrylate monomers, CN 293, CN294E, CN259 and CN454 available from Sartomers®; Solsperse 39,000 dispersant available from Lubrizol®; a thermal stabilizer Irgastab UV10 available from BASF®; optionally aerosol 200 vs available from Degussa Canada Ltd®; and a photoinitiator system composed of Irgacure 819, Bis(2,4,6-trimethylbenzoyl)-phenyl-phosphineoxide) and Irgacure 184, 1-Hydroxy-cyclohexyl-phenyl-ketone. In embodiments, the photoinitiator system may contain optionally Irgacure 379, 2-Dimethylamino-2-(4-methyl-benzyl)-1-(4-morpholin-4-yl-phenyl)-butan-1-one, and Esacure Kip 150, Oligo [2-hydroxy-2-methyl-1-[4-(1-methylvinyl) phenyl] propanone] respectively available from BASF®, BASF®, and Lamberti®. Other optional components or additives may include: 1) polyester oligomers selected from Sartomer®, e.g., CN2255, a high viscosity polyester acrylate oligomer with a glass transition T of −13° C. and CN2256 also a polyester acrylate oligomer with viscosity of 11,000 cps at 60° C. and a glass transition T of −22° C.; 2) a hindered amine light stabilizer such as TINUVIN®292; 3) a leveling agent such as Byk 3500, a polyether modified acryl functional polydimethylsiloxane; and 4) a defoamer such as Additol VXL 4951 available from Cytek®.

TABLE 1

| Chemical | Example 1 Wt % | Mass (g) |
| --- | --- | --- |
| AFLAIR520 Satin Bronze | 15.00 | 30.00 |
| BASF ® Irgalite Magenta SMA | 0.00 | 0.00 |
| Sartomer ® CN2255 (high visco) | 0.00 | 0.00 |
| Sartomer ® CN2256 | 7.00 | 14.00 |
| Ebecryl ® 2003 | 41.00 | 82.00 |
| Ebecryl ® 11 | 9.93 | 19.86 |
| Ebecryl ® 12 | 17.37 | 34.74 |
| Solsperse 39000 | 4.50 | 9.00 |
| Additol VXL 4951 | 2.00 | 4.00 |
| Irgacure 184 | 0.00 | 0.00 |
| Irgacure 819 | 0.00 | 0.00 |
| Ciba Irgastab UV10 | 0.20 | 0.40 |
| Aerosil 200 | 3.00 | 6.00 |
| Total | 100.00 | 200.00 |

The pearlescent inks produced for experimentation were water dilutable. Water may be added to the pearlescent ink compositions in low levels in order to adjust the materials' interaction properties with the DALI plate and the plate wetting solutions. A challenge for inks with large pigment sizes is observation of good background. Inks of large pigment size more easily press through the wetting solution layer with transfer. For the disclosed concepts, experimentation indicates that the background effect is mitigated by the addition of water to the pearlescent ink composition.

Produced test pearlescent inks were then printed using a drawdown coating apparatus for the evaluation of pearlescence, and prints were demonstrated with a DALI test plate. The produced pearlescent images exhibited an acceptable metallic sheen and had a film thickness of approximately 60 microns, much thicker than the 0.1 to 5.0 micron film thicknesses typically experienced in digital printing using, for example, jettable inks.

As described above, the proposed digital offset printing or DALI process may involve the transfer of a pigmented UV-curable ink onto a fluoro-silicone printing plate which has been partially coated with a wetting solution as a release agent. The ink is then optionally partially cured using UV light and transferred from the plate to the substrate, which may be generally unrestricted in its composition to include being one or more of a paper, a plastic or a metal. Once transfer is complete, the deposited ink images on the substrate may be exposed again to UV light for final curing of the deposited image on the substrate.

In order to meet the requirements of the digital offset printing or DALI process, the inks that are employed may possess many desirable physical and chemical properties. The inks must be compatible with materials with which they are brought into contact during the DALI process, including the printing plate, the wetting solution and the myriad image receiving medium substrates. The inks must also meet all functional requirements of the digital offset printing or DALI sub-systems, including appropriate wetting and transfer properties.

Inks formulated for the digital offset printing or DALI process are different in many ways from other conventional inks used in other applications, including conventional pigmented solid inks and other UV-curable gel inks. Digital offset printing or DALI inks generally contain much higher (up to 10 times) pigment loading and therefore have higher viscosities at room temperature. This higher pigment loading provides an advantage of increased hiding power on printed images. Another advantage of the digital offset printing or DALI inks is the limited requirement for any particle size reduction to which the solid constituent components are exposed during processing. Unlike pigmented jettable inks, which are subjected to high energy impact milling such as through attrition or media mills, offset inks are typically processed using a 3-roll mill, in which particle size is controlled by a number of passes, composition of the ink, and processing parameters. Compared with the jettable inks, larger particles (ten micron-sized and more) in the inks may be tolerated for digital offset printing or DALI processes. The latitude in the inclusion of larger particles may support or enable higher pearlescence in the variably printed products.

The disclosed embodiments propose ink formulations that have been developed to meet the printing requirements for a digital offset or DALI printer. In embodiments, pearlescent pigments are incorporated into the inks such that they meet these requirements, namely wetting and release properties from the proposed offset plate and compatibility with the non-aqueous wetting solutions usable with these image forming processes.

A printing demonstration was undertaken by hand testing using test DALI fluoro-silicone plates as the imaging plates and the Example 1 formulation shown above in Table 1 with particle size variations of 1-20 microns. Example 1 ink was applied by hand roller to fluoro-silicone-over-silicone test DALI plates and was observed to wet the plates. Application of a wetting solution to the plates was followed by rolling ink over the plates with a roller and then transferring with an even film from the plates to paper. The demonstration resulted in good background performance for the Example 1 ink. The addition of water to the pearlescent experimental ink was shown to enable modification in the background performance. The addition of 30 percent water to the base formulation displayed background performance close to what were considered to be acceptable levels. At or near 0 percent background is anticipated to be achievable through adjustments in the pearlescent ink formulation.

Pearlescent digital offset inks suitable for the proposed variable digital data offset lithographic image forming or DALI architectures and sub-systems are proposed using aqueous dilutable, curable commercially-available components. Many of the reactive monomers or oligomers that were investigated have been shown to be advantageous to enhance performance of printing the specialty ink in a variable digital data offset lithographic printing system. The proposed pearlescent ink formulations possess a number of advantages including: suitability for use with the proposed variable digital data lithographic image forming process; adjustable compatibility with the fountain (dampening and/or wetting) solutions and plate materials used for the proposed DALI image forming devices through use of an aqueous dilutable formulation; impressive settling stability due to high zero shear viscosity; and improved pearlescence based on the opportunity for high particle pigment loading and large pigment particle size (>10 microns).

Figure 2:
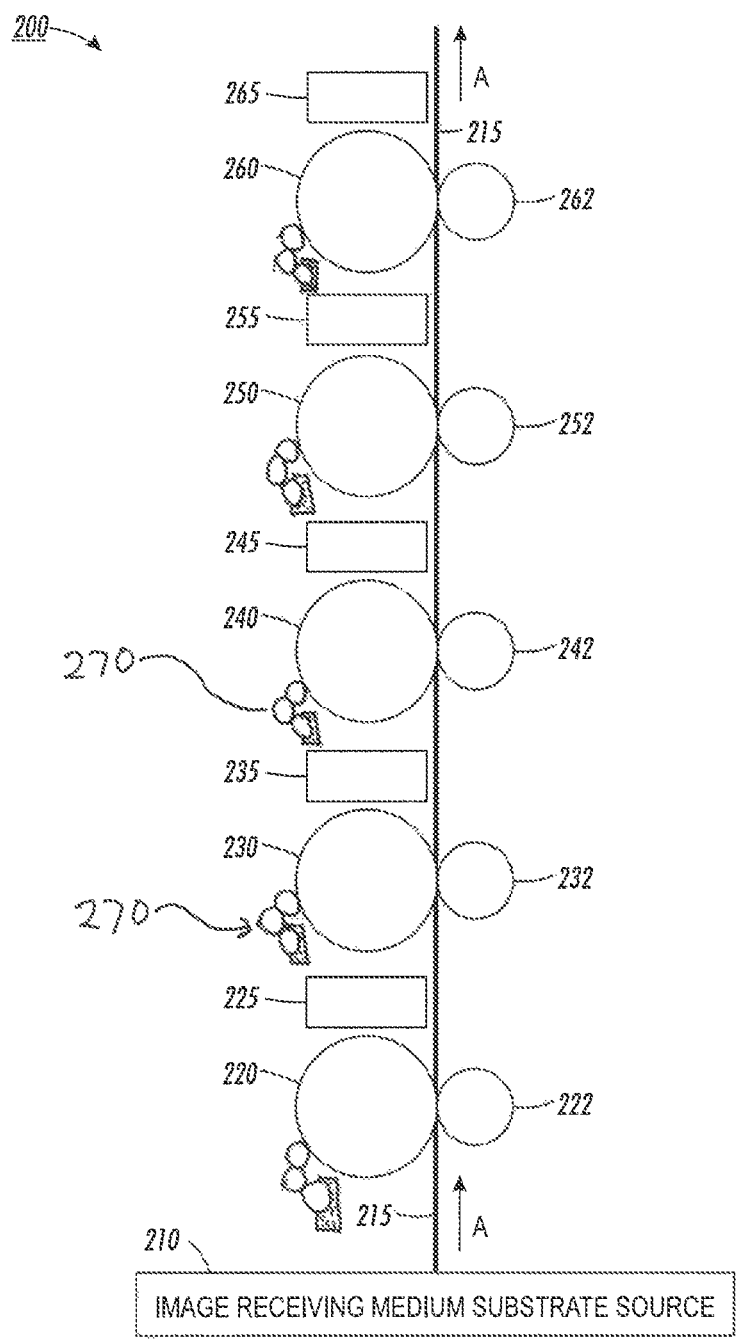
FIG. 2 illustrates a schematic representation of an exemplary embodiment of an image forming device that may be used to implement variable digital data pearlescent image forming according to this disclosure.

FIG. 2 illustrates a schematic representation of an exemplary embodiment of an image forming device 200 for implementing variable digital pearlescent image forming according to this disclosure. As shown in FIG. 2, individual image receiving medium substrates may be provided in an image receiving medium substrate source 210. The individual image receiving medium substrates may be sequentially passed along an image receiving medium transport path 215 in direction A.

The individual image receiving medium substrates may be passed from multiple transfer nips formed between inked imaging rollers 220, 230, 240, 250, 260 and the opposing rollers 222, 232, 242, 252, 262 in order to deposit one or more separate consistencies and colors of inks, including a particularly-formulated pearlescent ink, on at least select portions of the individual image receiving medium substrates. One or more of the inked imaging rollers 220, 230, 240, 250, 260 may be conventional lithographic image transfer rollers. At least the one of the inked imaging rollers 220, 230, 240, 250, 260 that is configured and/or designated for the deposition of the pearlescent ink described in this disclosure may otherwise be an image transfer roller that is part of an individual and separate variable digital data offset lithographic system as shown, for example, in FIG. 1. It should be noted that all of the imaging rollers to 220, 230, 240, 250, 260 may be an image transfer roller that is each a part of an individual and separate variable digital data offset lithographic system. As each of the one or more colored inks may be deposited on an individual image receiving medium substrate as that substrate proceeds along the image receiving medium transport path 215, each of the deposited one or more colored inks may be at least partially cured by one or more individual curing devices 225, 235, 245, 255, 265.

Those of skill in the art recognize that it is likely that individual portions of a particular image transferred to an image receiving medium substrate may be exclusively reserved to imaging by the one or more imaging rollers of pearlescent image elements separate and apart from text and other multicolor image elements. This disclosure, however, makes no distinction between one or the other of the pearlescent image elements and the other text and/or multicolor image elements being in any specific background/foreground relationship with respect to one another. It is envisioned that pearlescent image elements may be available and applied in a manner that may enhance, for example, underlying multicolor imaging elements in certain applications. In this regard, all combinations of compatible image forming according to variable digital data input to an exemplary system such as that, for example, depicted in FIG. 2 may be available. In the various combinations of application of individual image forming elements from one or more imaging rollers, it is anticipated that some amount of intermediate curing may be undertaken, and that a final curing process is implemented by, for example, a final curing device 265 positioned at a position downstream of all of the imaging rollers prior to ejecting an image receiving medium substrate with an image deposited and cured thereon to, for example, an output tray (not shown).

Figure 3:
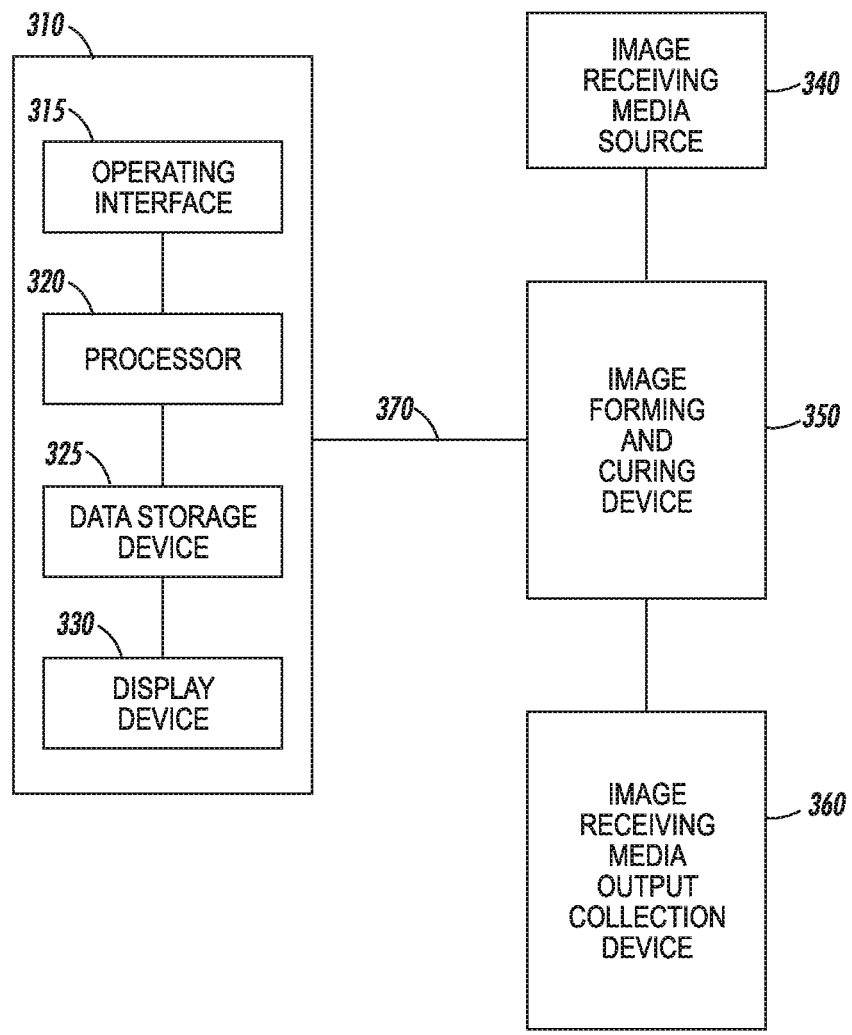
FIG. 3 illustrates a block diagram of an exemplary embodiment of an image forming system implementing variable digital data pearlescent image forming according to this disclosure.

FIG. 3 illustrates a block diagram of an exemplary embodiment of an image forming system 300 for implementing variable digital data pearlescent image forming according to this disclosure.

The exemplary image forming system 300 may include an exemplary control system 310. All or some of the components of the exemplary control system 310 may be included as integral components of the exemplary image forming system 300. Otherwise, certain of the components of the exemplary control system 310 for undertaking processing and control functions for the exemplary image forming system 300 may be housed in, for example, a separate computing device that may be associated with the exemplary image forming system 300, and connected, for example, to the exemplary image forming system 300 via a communication link 370, which may be constituted of a wired or wireless data connection between the exemplary control system 310 and other components of the exemplary image forming system 300.

Generally, in the image forming system 300, individual image receiving medium substrates (sheets) may be provided in an image receiving media source 340, which may include, for example, an input image media source tray. The image receiving medium substrates may be transported to an image forming and curing device 350, which may be constituted of a digital offset image forming device, where the images are formed by depositing image marking material separately from one or more imaging rollers, or from separate image marking material sources associated with a single variable digital data imaging roller, on the image receiving medium substrates. The image receiving medium substrates with the images formed, fused and fixed thereon, including pearlescent image elements according to the disclosed concepts being formed, fused and fixed thereon, may be transported to, and deposited in, an image receiving media output collection unit 360, such as, for example, an output tray.

The exemplary control system 310 may include an operating interface 315 by which a user may communicate with the exemplary control system 310 for directing image forming operations, including the forming of variable pearlescent image elements, on the image receiving medium substrates in the image forming system 300. The operating interface 315 may be a locally accessible user interface associated with the image forming system 300. The operating interface 315 may be configured as one or more conventional mechanisms common to control devices and/or computing devices that may permit a user to input information to the exemplary control system 310. The operating interface 315 may include, for example, a conventional keyboard, a touchscreen with "soft" buttons or with various components for use with a compatible stylus, a microphone by which a user may provide oral commands to the exemplary control system 310 to be "translated" by a voice recognition program, or other like device by which a user may communicate specific operating instructions to the exemplary control system 310. The operating interface 315 may be a part of a function of a graphical user interface (GUI) mounted on, integral to, or associated with, the image forming system 300 with which the exemplary control system 310 is associated.

The exemplary control system 310 may include one or more local processors 320 for individually operating the exemplary control system 310 and for carrying out operating functions in the image forming system 300. Processor(s) 320 may include at least one conventional processor or microprocessor that interprets and executes instructions to direct specific functioning of the exemplary control system 310 and image forming system 300.

The exemplary control system 310 may include one or more data storage devices 325. Such data storage device(s) 325 may be used to store data or operating programs to be used by the exemplary control system 310, and specifically the processor(s) 320. Data storage device(s) 325 may be used to store information regarding individual operating characteristics of the image forming and curing device 350 to, for example, control image forming, including pearlescent image forming, in the image forming and curing device 350. These stored schemes may control all operations of the image forming system 300. The data storage device(s) 325 may include a random access memory (RAM) or another type of dynamic storage device that is capable of storing updatable database information, and for separately storing instructions for execution of system operations by, for example, processor(s) 320. Data storage device(s) 325 may also include a read-only memory (ROM), which may include a conventional ROM device or another type of static storage device that stores static information and instructions for processor(s) 320. Further, the data storage device(s) 325 may be integral to the exemplary control system 310, or may be provided external to, and in wired or wireless communication with, the exemplary control system 310.

The exemplary control system 310 may include at least one data display device 330, which may be configured as one or more conventional mechanisms that output information to a user, including, but not limited to, a display screen on a GUI of the image forming system 300 with which the exemplary control system 310 may be associated. The data display device 330 may be used to indicate to a user a status of an image forming operation in the image forming system 300, or specific operation of the image forming and curing device 350 for executing imaging and pearlescent image element forming operations.

All of the various components of the exemplary control system 310, as depicted in FIG. 3, may be connected internally, and to the image forming and curing device 350, by one or more data/control busses. These data/control busses may provide wired or wireless communication between the various components of the exemplary control system 310, whether all of those components are housed integrally in, or are otherwise external and connected to, other components of the image forming system 300 with which the exemplary control system 310 may be associated.

It should be appreciated that, although depicted in FIG. 3 as an essentially integral unit, the various disclosed elements of the exemplary control system 310 may be arranged in any combination of sub-systems as individual components or combinations of components, integral to a single unit, or external to, and in wired or wireless communication with, the single unit of the exemplary control system 310. In other words, no specific configuration as an integral unit or as a support unit is to be implied by the depiction in FIG. 3. Further, although depicted as individual units for ease of understanding of the details provided in this disclosure regarding the exemplary control system 310, it should be understood that the described functions of any of the individually-depicted components may be undertaken, for example, by one or more processors 320 connected to, and in communication with, one or more data storage device(s) 330, all of which support operations in the image forming system 300.

Figure 4:
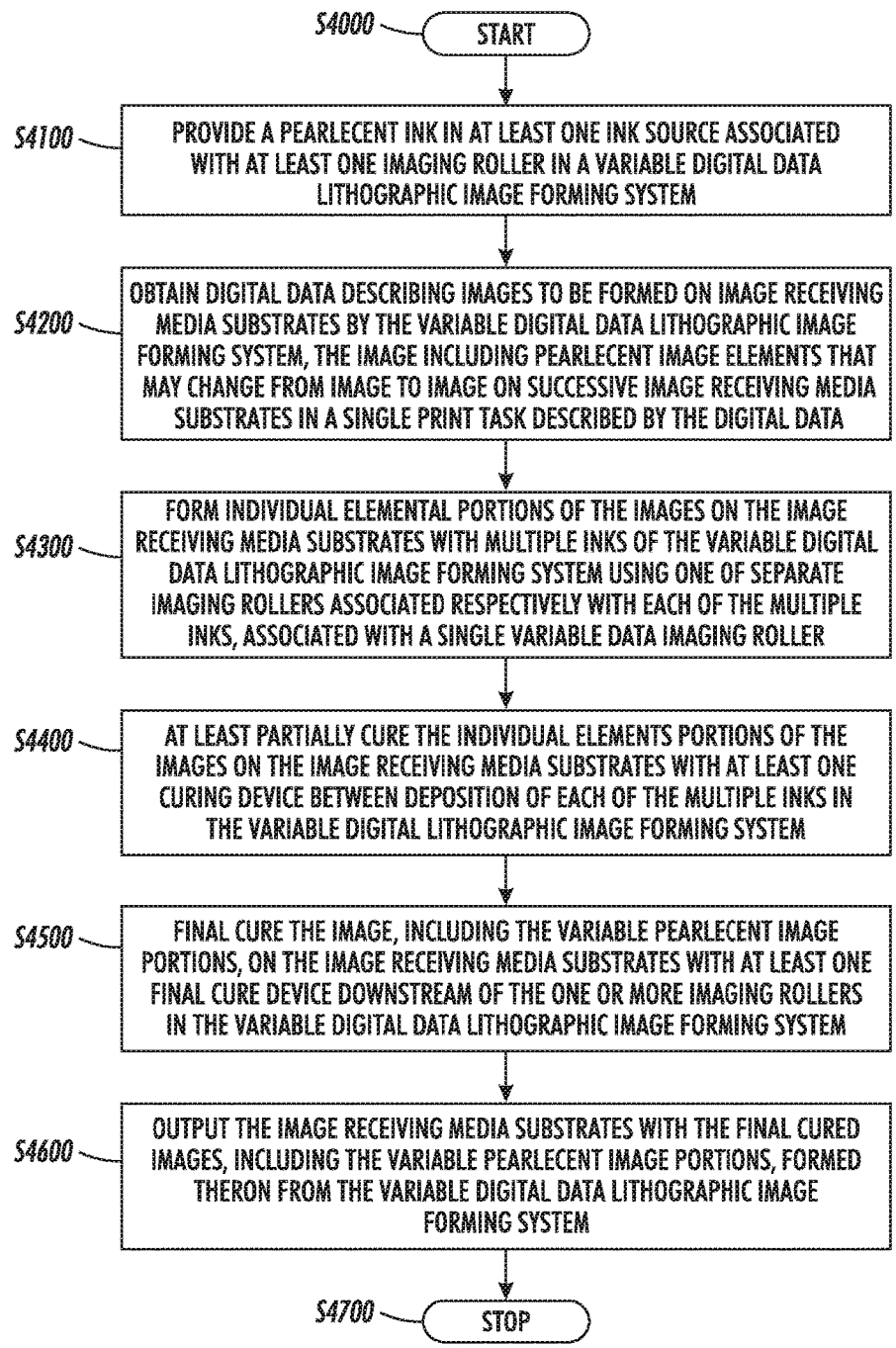
FIG. 4 illustrates a flowchart of an exemplary method for implementing variable data lithographic printing for pearlescent image forming in a proposed variable data lithographic printing system according to this disclosure.

The disclosed embodiments may include an exemplary method for implementing variable data lithographic printing for pearlescent image forming in a proposed variable data lithographic printing system. FIG. 4 illustrates a flowchart of such an exemplary method. As shown in FIG. 4, operation of the method commences at Step S4000 and proceeds to Step S4100.

In Step S4100, a pearlescent ink may be provided in at least one ink source associated with at least one imaging roller in a variable digital data lithographic image forming system. Based on the fact that according to this disclosure pearlescent image elements are likely to change from image to image, or substrate to substrate, the at least one imaging roller with which the at least one pearlescent ink source is associated in the variable digital data lithographic image forming system will comprise a variable data lithography system such as that shown, for example, in FIG. 1. Operation of the method proceeds to Step S4200.

In Step S4200, digital data describing images to be formed on image receiving media substrates by the variable digital data lithographic image forming system may be obtained. The digital data may be obtained, for example, by user input of information via some form of operating interface, or may be recovered from a storage device based on some user input. In other words, sources of the digital data describing the images to be formed on the image receiving media substrates may be obtained according to known methods and provided to the variable digital data lithographic image forming system via wired or wireless communications. The digital data describing the images to be formed on the image receiving media substrates may include information regarding pearlescent image elements to be produced as part of the overall images formed on the image receiving media substrate, the pearlescent image elements changing from image to image or substrate to substrate on successive image receiving media substrates ordered by digital data pertaining to a single print task to be carried out by the variable digital data lithographic image forming system. Operation of the method proceeds to Step S4300.

In Step S4300, individual elemental portions of the images on the image receiving media substrates may be individually formed using multiple inks of the variable digital data lithographic image forming system. The individual inks may be applied using separate imaging rollers associated, for example, one each with each of the individual inks. Alternatively, the individual inks may be applied using separate cycles of a single rewritable imaging roller with access to individual ink sources for each of the individual inks, including the pearlescent ink. When using multiple imaging rollers, the multiple imaging rollers, other than the pearlescent ink imaging roller, may be associated with separate image forming modules 270 (FIG. 2) that may be variable digital data lithographic image forming modules, or may be associated with separate image forming modules that may be conventional lithographic image forming modules, the imaging rollers including, for example, semi-fixed plates on imaging drums.

It is envisioned that, although the variable data lithography system shown in exemplary manner in FIG. 1 is generally depicted and described as a single color image forming module, advances in the variable data lithography system may provide for producing multicolor images using a single reimageable surface on a single imaging member as shown. In such instances, separate cycles of the imaging member may introduce marking materials of differing colors. Operation of the method proceeds to Step S4400.

In Step S4400, some or each of the individual elemental portions of the images formed on the image receiving media substrates as a single color, or in multiple colors, may be at least partially cured in a manner that fixes the individual elemental portions of the images on the image receiving media substrates. This partial curing may prove particularly advantageous in a variable digital data lithographic image forming system in which the image receiving media substrates are subjected to multiple image transfers at multiple image forming nips, or in multiple cycles of a single image forming nip. Partial curing of the portions of the images transferred to the image receiving media substrate at previous stages in the image forming processes will reduce, or substantially eliminate, a potential for back transfer of the already deposited individual elemental portions of the images subsequent image forming nips or on separate cycles through a same image forming nip. Operation of the method proceeds to Step S4500.

In Step S4500, the total images, including the pearlescent image portions, may be ultimately cured and/or fused on the image receiving media substrates with at least one final cured device downstream of the one or the last imaging roller in the variable digital data lithographic image forming system that forms the images, including the pearlescent image elements or portions, on the image receiving media substrates. Operation the method proceeds to Step S4600.

In Step S4600, the image receiving media substrates, with the final cured images, including the pearlescent image elements or portions, formed thereon may be output from the variable digital data lithographic image forming system. Operation the method proceeds to Step S4700, where operation of the method ceases.

The above-described exemplary systems and methods may reference certain conventional lithographic image forming device components to provide a brief, background description of image forming means that may be modified to carry out variable digital data lithographic image forming for images which include, at least in part, images formed using pearlescent inks, in a system using a unique imaging forming technique. No particular limitation to a specific configuration of the variable data lithography portions or modules of an overall variable digital data lithographic image forming system is to be construed based on the description of the exemplary elements depicted and described above.

Those skilled in the art will appreciate that other embodiments of the disclosed subject matter may be practiced with many types of image forming elements common to lithographic image forming systems in many different configurations. As mentioned briefly above, multiple single color/single ink modules may be provided to form multicolor images including pearlescent image elements or portions, or a single multiple color/multiple ink module may be provided to form the multicolor images including the pearlescent image elements or portions. In other words, no particular limiting configuration is to be implied from the above description and the accompanying drawings.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 4, and the accompanying description, except where a particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

As indicated in detail above, while the exemplary composition of the experimental pearlescent ink shown in Table 1 provide a single example of an appropriate composition of individual materials that may be used to comprise the disclosed pearlescent inks, compatible with variable data lithographic image forming, it should be understood that one of skill in the art may deviate from the experimental composition in order to optimize the ink used to form the pearlescent image elements or portions on specified image receiving media substrates using the systems and methods according to this disclosure. In other words, although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A method for forming a plurality of variable pearlescent image elements or portions on image receiving media substrates, comprising:
    applying at least first image elements or portions on image receiving media substrates using at least one first ink from at least one first ink source for inked image formation on the image receiving media substrates in a single image forming device, the at least one first ink being a conventional imaging ink;
    at least partially curing the at least first image elements or portions on the image receiving media substrates;
    applying variable second image elements or portions on the image receiving media substrates with at least one variable data lithography device, the second image elements or portions being variable pearlescent image elements or portions and the at least one variable data lithography device including:
        an imaging member with a reimageable surface supporting digital data reimaging for lithographic image transfer to an image receiving medium substrate;
        a wetting solution source that deposits a layer of wetting solution on the reimageable surface;
        an optical patterning subsystem that patterns a latent image according to received digital data in the layer of wetting solution through selective evaporation of the layer of wetting solution;
        a second ink source that supplies a pearlescent ink to the reimageable surface to produce a pearlescent inked image from the patterned latent image for transfer of the variable pearlescent image elements or portions to the image receiving media substrates, the pearlescent ink including a solid particle pearlescent pigment component in a proportion of at least 30% by weight, and having an average particle size of greater than 15 microns, suspended in a solution in the pearlescent ink, the solution having a functional acrylate monomer, at least one dispersant, a thermal stabilizer, and a photo initiator system; and
    final curing the pearlescent image elements or portions and the first image image elements or portions as image elements on the image receiving media substrates by a curing device to produce an output document that includes the variable pearlescent image elements or portions in different parts of the output document.

2. The method of claim 1, the first ink source being included as a module in the at least one variable data lithography device.

3. The method of claim 2, the first ink source applying the at least one first ink to the reimageable surface to produce the first image elements or portions from the patterned latent image on at least one imaging cycle in which the at least one variable data lithography device transfers the first image elements or portions to the image receiving media substrates in at least one imaging cycle that is a separate imaging cycle of the at least one variable data lithography device from an imaging cycle in which the pearlescent image elements or portions are applied to the image receiving media substrates using the pearlescent ink from the second ink source.

4. The method of claim 1, the first ink source being a component of a separate marking module.

5. The method of claim 4, the separate marking module applying the first image elements or portions on the image receiving media substrates separately from the at least one variable data lithography device applying the pearlescent image elements or portions on the image receiving media substrates using the pearlescent ink from the second ink source.

6. The method of claim 5, the separate marking module comprising a conventional lithographic marking device.

7. The method of claim 5, the separate marking module comprising another at least one variable data lithography device.

8. The method of claim 5, further comprising at least partially curing applied image elements or portions on the image receiving media substrates by another curing device prior to applying other image elements or portions on the image receiving media substrates, the another curing device positioned between the separate marking module and the at least one variable data lithography device in a process direction.

9. The method of claim 3, further comprising at least partially curing each image element or portion on the image receiving media substrates by another curing device between steps of applying other image elements or portions on the image receiving media substrates.

* * * * *